Oct. 21, 1969    A. W. STANDAART    3,474,458
AUTOMATIC BLOOD SEDIMENTATION RATE RECORDER
Filed April 3, 1968    4 Sheets-Sheet 3

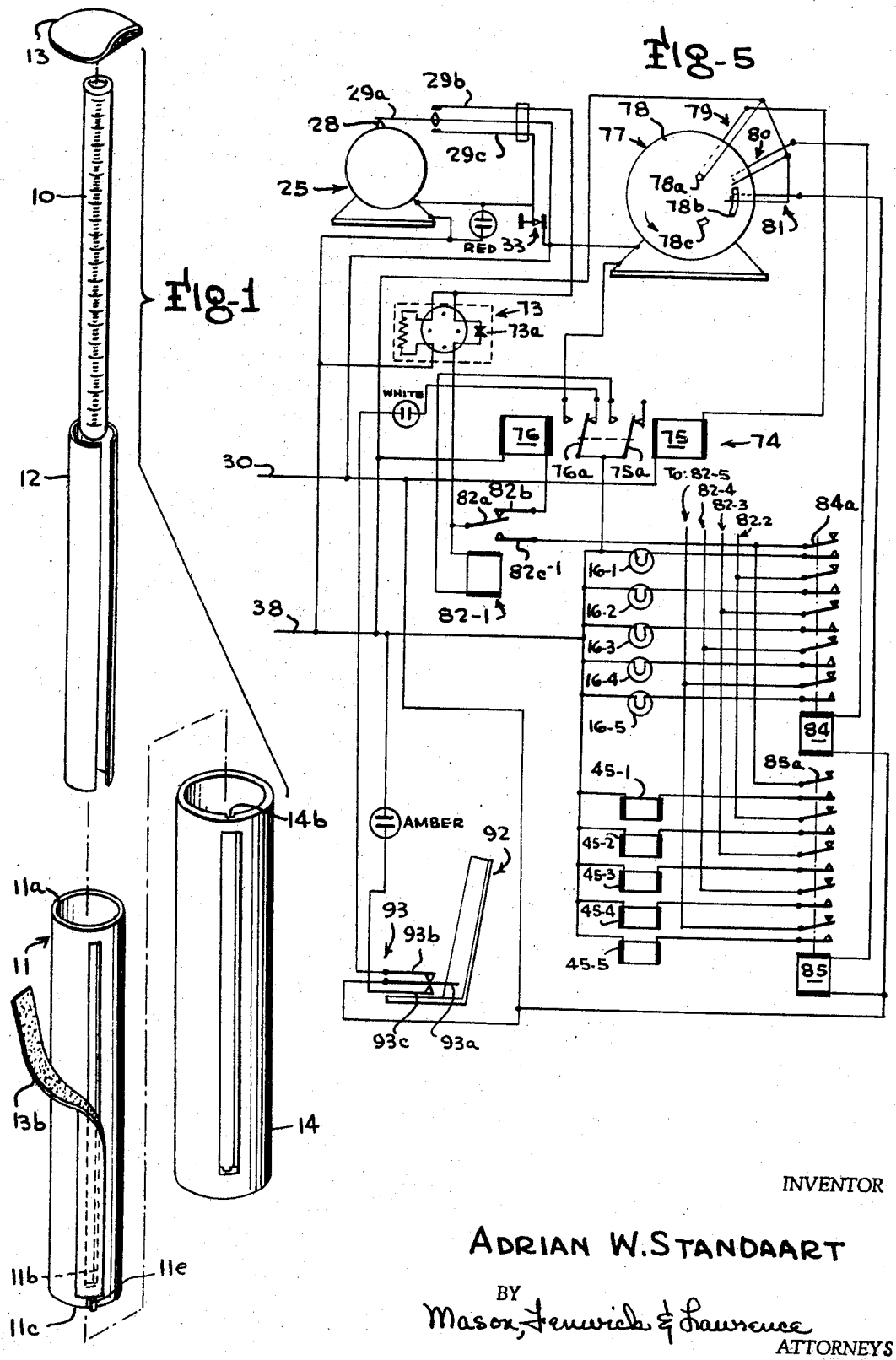

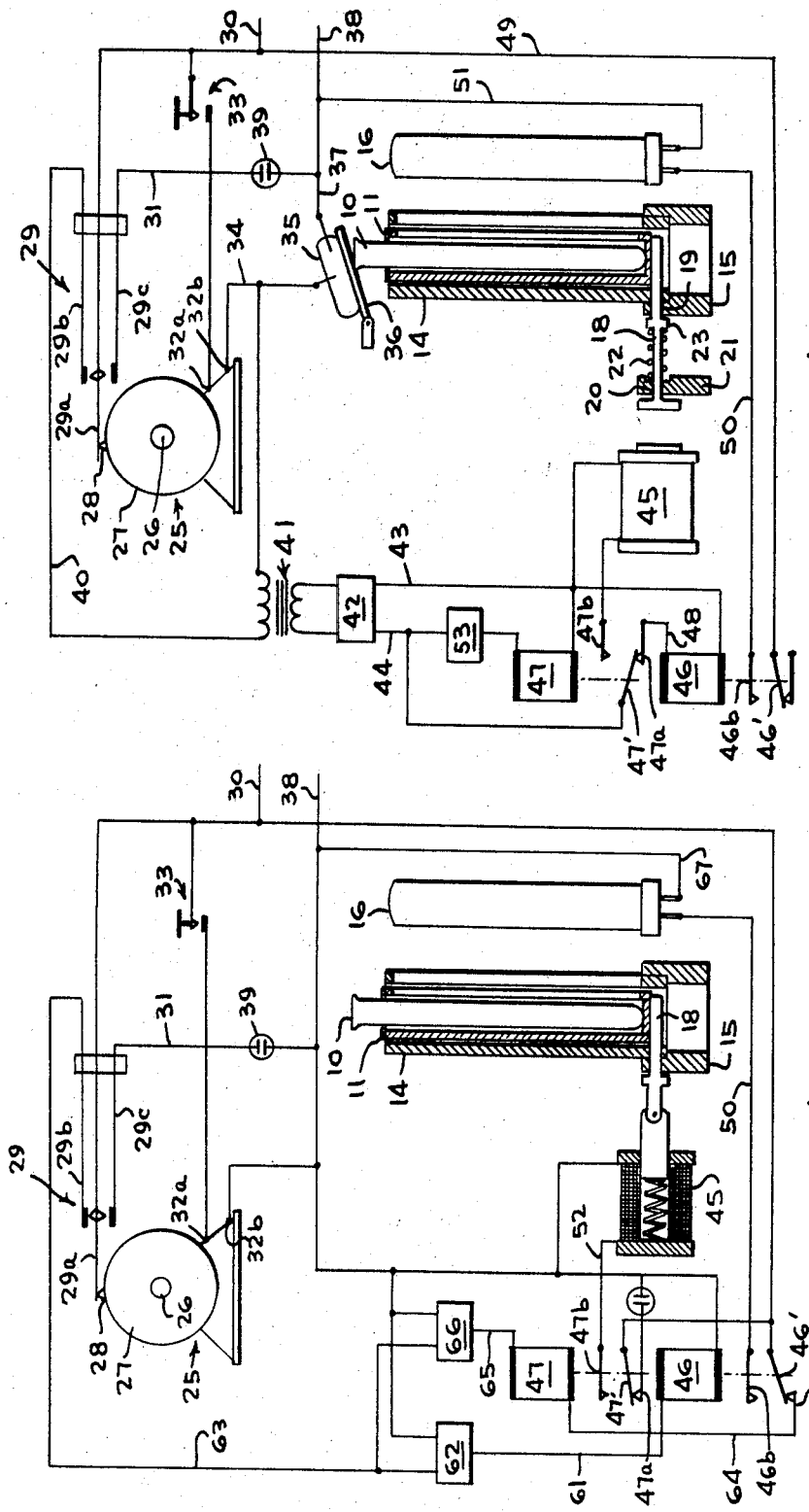

INVENTOR
ADRIAN W. STANDAART
BY Mason, Fenwick & Lawrence
ATTORNEYS

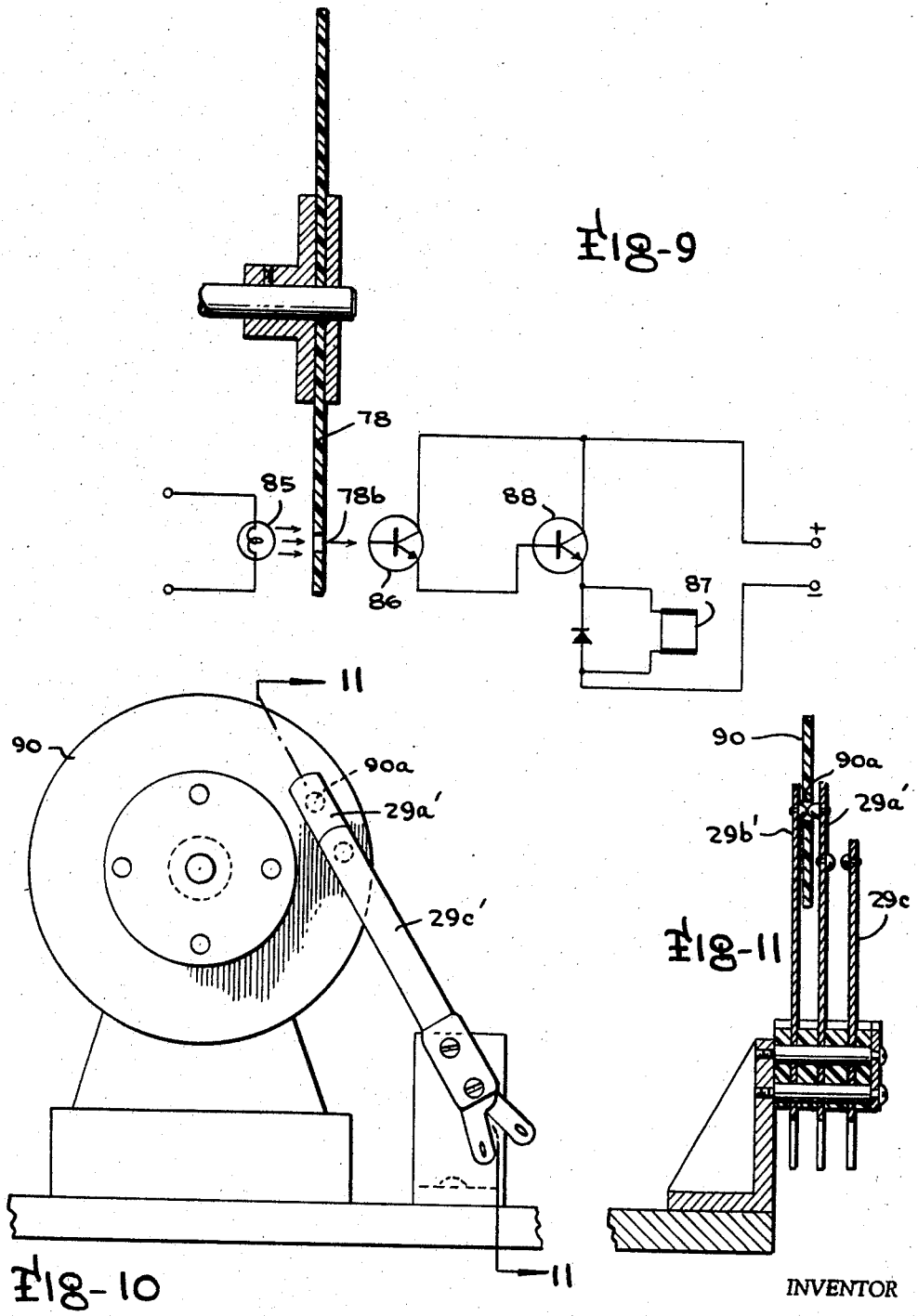

United States Patent Office 3,474,458
Patented Oct. 21, 1969

3,474,458
AUTOMATIC BLOOD SEDIMENTATION RATE RECORDER
Adrian W. Standaart, Winston-Salem, N.C., assignor of twelve and three-fourths percent each to Donald S. Morris, John K. Gallaher, E. Howard Cannon, and J. B. Phillips, Jr.
Filed Apr. 3, 1968, Ser. No. 718,442
Int. Cl. G01d 9/42, 15/26
U.S. Cl. 346—107     20 Claims

ABSTRACT OF THE DISCLOSURE

An automatic blood sedimentation rate recording apparatus wherein a test tube containing a blood sample is placed in a cartridge having a photosensitive inner surface and a light slit, and a timer and relay circuit times out a selected test period, for example of one hour, activates an exposure lamp to photographically record in the photosensitive surface an image of sedimentation layers in the test tube, and the test tube is then displaced to a distinctive position signaling completion of the test and recording.

BACKGROUND OF THE INVENTION

The present invention relates in general to apparatus for automatic timing and recording of certain sedimentation tests to establish the rate of sedimentation in liquids containing opaque matter in suspension, and more particularly to apparatus for timing and recording measurement of the sedimentation rate of human blood.

Measurement of the sedimentation rate of human blood is an old and often used test in the hemalotogical laboratory as a test for the presence of inflammation, infection and other conditions. The basic test is simple, but has many variations. The Wintrobe method is generally recognized as the criterion. So many variations have been devised that these variations may create differences in interpretation when laboratory results are given. Many have recognized the desire that one standardized test, and one method, be adopted throughout the whole of the medical profession. The Wintrobe method fulfills all requirements and is preferred by many as the one which should be adopted as the standardized test. However, the Wintrobe method, as are all the other methods known to me, is strictly manual. In a modern laboratory it is also subject to inaccuracies in timing, identification, etc.

Basically, the Wintrobe method requires venous blood, drawn into a dry syringe and anticoagulated by a method which preserves the red cell size and shape. This anti-coagulated blood is put into a small test tube approximately 115 millimeters long, with a 3 millimeter bore and a scale in millimeters etched or printed on the surface of the tube. If the Westergren method is used, the blood is placed in a pipette approximately 300 millimeters long having an approximate 2.5 millimeter inner diameter and a graduated scale over the lower 200 millimeter portion of the pipette. After the contents are well mixed, it is placed into a vertical position, and after an exact 60 minute lapse of time, the scaled tube is read for a unique sedimentation picture of blood cells and blood plasma which appear in distinct layers.

Exact timing of the 60-minute lapse of time in which the mixture in the Wintrobe tube is to stand in a vertical position and reading of the location of the boundaries of the various layers at exactly 60 minutes after the tube is placed in a vertical position introduces practical problems in the modern laboratory. Technicians busy with performing other tests frequently have difficulty in precisely timing the reading of the location of the boundary layers at exactly 60 minutes following placing of the Wintrobe tube in vertical position. Also, it would be desirable to have some permanent record of the appearance of the Wintrobe tube and the blood component layers therein not only for rechecking the accuracy of the technician's readings, but also for positive patient sample identification.

OBJECTS OF THE INVENTION

An object of the invention, therefore, is the provision of apparatus for automatically timing the vertical standing time of a mixture of blood sample and anti-coagulating chemical solution in a test tube and photographically recording the distribution of layers in the test tube at the completion of the 60 minutes standing time.

Another object of the present invention is the provision of novel apparatus for automatically timing the sample standing time and photographically recording the condition of the sample in performing a blood sedimentation rate test.

Another object of the invention is the provision of novel apparatus for performing and recording blood sedimentation rate tests, wherein, at the completion of a 60 minute standing time, the apparatus is automatically cycled to produce a photographic exposure of a test tube containing the blood sample and then release the test tube from preselected supported condition in the apparatus.

Other objects, advantages and capabilities of the present invention will become apparent from the following detailed description, taken in conjunction with the accompanying drawings showing plural embodiments of the invention.

BRIEF DESCRIPTION OF THE FIGURES

FIGURE 1 is an exploded perspective view of a Wintrobe tube for containing a blood sample, together with a photographic cartridge therefor and the holder portion of the apparatus of the present invention;

FIGURE 3 is a schematic diagram of the apparatus of the present invention, with the holder and supporting structure for the test tube and photographic cartridge shown in vertical section, which embodiment of the apparatus includes some direct current circuit components;

FIGURE 4 is a schematic diagram similar to FIGURE 3, for a modified form of the apparatus of the present invention in which all components are alternating current components;

FIGURE 5 is a schematic view of another embodiment of the apparatus embodying the present invention, adapted to time and record a plurality of blood samples introduced into the apparatus at different times;

FIGURE 9 is a diagrammatic view of a light sensing version of the sequence timing disk assembly; and FIGURES 10 and 11 are respective side elevation and vertical section views of a timing disk and contact arrangement usable instead of the one-hour timing cam of FIGURES 3 to 5.

DETAIL DESCRIPTION OF THE INVENTION

Figure 2:
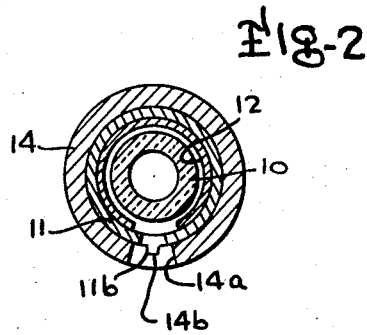
FIGURE 2 is a horizontal section view taken through the assembly of FIGURE 1.

Referring to the drawings, wherein like reference characters designate corresponding parts throughout the several figures, and particularly to the embodiment shown in FIGURES 1 and 2, the blood sample to be subjected to sedimentation rate measurement and recording, together with the appropriate anticoagulation chemical solution, are placed in the usual test tube or pipette 10, customarily used for such tests. In the embodiment shown in FIGURES 1 and 2, this test tube 10 is then placed within a hollow photographic cartridge 11, which may be specially designed to remain light-tight until placed in use, which may be of any desired external cross sectional configuration, and has a bore to accommodate the test tube, the entire cartridge being cylindrical in the illustrated embodiment. The cartridge 11 has a length approximating, but slightly less than, the axial length of the test tube 10, such as a Wintrobe tube having millimeter graduations thereon, and having an inner diameter just larger than the outer diameter of the test tube 10 to snugly receive the test tube therein. This cartridge 11 is of opaque material, for example of opaque plastic or metal 11a, in the shape of a cylinder having a vertically elongated light slit 11b, for example about ⅛-inch wide, extending substantially the height thereof, and a circular bottom 11c. Releasably disposed within the cardboard cylinder is a sheet of photosensitive material 12, curved in a concave configuration against the inner surface of the cylinder 11a, with its edges spaced apart to provide a space therebetween registering with the slit 11b. This photosensitive material 12 may be of the type of photographic emulsion customarily employed for Polaroid cameras, to record a photographic image of the graduations on the tube 10, and an image of the respective fluid levels of different densities within the test tube 10 upon exposure of the test tube and cartridge to light emanating from a proper direction. Of course, if a test tube is used which has no graduation scale thereon, appropriate graduation may be preprinted on the photosensitive material layer. The cartridge 11 is made light-tight by having a top 13a of black masking tape, which can be readily punctured by the test tube during insertion of the test tube axially through the top, and has a removable strip of black masking tape 13b covering the slit 11b.

Alternatively, a photosensitive material which is not exposed by normal daylight, but may be exposed by a high intensity flashlamp, may be used in the cartridge 11 without necessitating light sealing of the cartridge with masking tape.

The automatic sedimentation rate recorder of the present invention, diagrammatically illustrated in FIGURE 3, provides a holder for the test tube and cartridge assembly, in the form of an upright, hollow, cylindrical holder 14, either of transparent material, such as transparent plastic or glass, or of opaque material having a vertical slit 14a, for example about ⁷⁄₃₂-inch wide, registering with the slit 11b, having an inner diameter slightly greater than the outer diameter of the cartridge 11 and an axial length slightly greater than the axial length of the cartridge 11. The holder 14 may, if desired, have a vertical groove 14b in the inner surface thereof, aligned for example with the center of the slit 14a, to slidably receive a narrow tongue 11e projecting outwardly from the bottom of the cartridge 11 at an appropriate position to insure proper registration of the slits 11b and 14a. This holder 14 is supported in any suitable mounting base 15, for example of annular configuration, and is located adjacent an exposure lamp 16, preferably of the elongated type having an axial length corresponding substantially to the axial length of the cartridge 11 producing substantially uniform light over the axial length thereof. The exposure lamp 16 is supported alongside the holder 14 in a conventional socket type base 17. A retractable supporting plunger 18 provides support for the bottom of the cartridge 11 and test tube 10 within the holder 14, and is slidably supported in a radial opening 19 in the mounting base 15 and lower portion of the holder 14, as well as in an aligned opening 20 in a plunger supporting block or post 21. The plunger is preferably resiliently biased to the supporting position illustrated in FIGURE 3, wherein the end portion of the plunger 18 underlies the test tube 10 and cartridge 11 to form a supporting floor or platform for the bottom thereof and locate the top of the cartridge 11 in substantial alignment with the top of the holder 14 with the test tube 10 projecting a short distance above the aligned tops of the holder 14 and cartridge 11. The plunger 18 is biased by means of a spring 22 bearing at one end against the plunger supporting post 21 and at the other end against a collar formation or shoulder means 23 on the plunger 18 to continuously bias the plunger 18 to the right, as viewed in FIGURE 3.

An AC timer motor 25 is provided, having internal gearing or a gear reduction unit associated therewith to provide one revolution per hour rotation of an output shat 26 which carries a timer cam 27, having a raised lobe 28 at a selected angular position thereon. Associated with the timer motor 25 and timer cam 27 is a cam controlled switch 29 having an intermediate movable contact member 29a engaging the periphery of the timer cam 27 to be controlled thereby and a pair of upper and lower flanking stationary contacts 29b and 29c. In the initial or rest position of the timer motor 25 at the beginning of a timing cycle, the timer cam lobe 28 is positioned to position the movable contact member 29a in an intermediate position such that it is out of engagement with both stationary contacts 29b and 29c. One conductor or lead 30 from a conventional 120-volt, 60-cycle AC supply is connected to the movable contact member 29a and a lead 31 extends from the lower stationary contact 29c to one input terminal 32a of the timer motor 25. A manual push button start switch 33 is connected between the leads 30 and 31 to provide a by-pass circuit for connecting the input supply lead 30 to the timer motor terminal 32a when the motor 25 is stopped at a position lifting the movable contact member 29a out of contact with the lower stationary contact 29c, for purposes of starting the cycle of the unit. The other input terminal 32b of the timer motor 25 is connected by lead 34 to one electrode of a mercury switch 35 mounted on a hinge support 36, the other electrode of the mercury switch 35 being connected through lead 37 to the other supply conductor or lead 38 from the 120-volt AC supply. The mercury switch 35 is of such nature that it completes an electrical circuit between the electrodes thereof when it is disposed at a selected angular position, for example in a range of about 12° to 15° from the horizontal, but breaks the circuit between these electrodes when it is in a horizontal position or in a substantially vertical position. This mercury switch 35 is supported by its hinge support 36 adajcent the upper end of the holder 14 to be swung to a vertical position for insertion of a cartridge 11 and test tube 10 into the holder 14 and then to be lowered into an inclined position resting against the top of the upwardly projecting end of the test tube 10, as illustrated in FIGURE 3. At this inclined position, the mercury switch 35 assumes a proper angle to complete the circuit between the electrodes thereof and thus provides a closed circuit from the input supply lead 38 through the lead 37 and switch 35 and lead 34 to the input terminal 32b of the timer motor 25.

An indicator lamp 39, for example a conventional neon lamp, is connected across the leads 38 and 31 to glow and therefore indicate that the timing motor 25 is in operation when voltage is present on these two leads.

The upper stationary contact 29b of the cam control switch 29 is connected by lead 40 to one input of a transformer 41, the other input terminal of the transformer being connected through the mercury switch 35 to the input supply lead 38. The secondary of the transformer 41 is connected to a conventional rectifier 42, which in conjunction with the transformer 41 provides approximately 24-volts DC to the output leads 43 and 44 terminal The lead 43 is connected directly to one input terminal of an electromagnet coil 45 disposed adjacent the plunger 18 to magnetically attract the plunger 18 and withdraw the same against the bias of the spring 22 from beneath the test tube 10 and cartridge 11 upon energization of the electromagnet coil 45 and allow the test tube and cartridge to drop from the holder 14. It will be appreciated that a solenoid having an elongated plunger may be readily used, rather than the separate electromagnet coil 45 and plunger 18. The rectifier output lead 43 is also connected directly to one terminal of the coil of relay 46 and to one terminal of the coil of relay 47. The other terminal of the coil of relay 46 is connected by lead 48 to the normally closed stationary contact 47a of relay 47, the movable contact member 47' of which is also connected to rectifier output lead 44. The movable contact arm 46' of relay 46 is connected by lead 49 to one of the 120-volt input supply leads 30 and the normally open stationary contact 46b of relay 46 is connected by lead 50 to the lamp base 17 as one of the inputs for the lamp 16. The other input to the lamp 16 is provided by lead 51, connected between the lamp base 17 and the 120-volt input supply lead 38. The other input terminal of the electromagnet coil 45 is connected by lead 52 to the normally open stationary contact 47b of relay 47.

The relay 47 provides a delay in breaking the contact between its movable contact member 47' and the normally closed stationary contact 47a equal to the desired period the lamp 16 should be on to effect a proper exposure of the photographic emulsion of the cartridge 11. This may be accomplished by either incorporating a built-in delay feature in the relay 47 or by interposing a conventional delay device 53 in the supply lead 54 thereof between the rectifier output lead 44 and the other input terminal of the coil of relay 47. For example, the delay device 53 may be designed to introduce a two-second delay between the time of operation of relay 46 to make contact between its movable contact arm 46' and its stationary contact 46b, and the operation of relay 47 to make contact between its movable contact arm 47' and the normally open contact 47b.

The operation of the hereindescribed timer structure should now be apparent. After the laboratory technician or operator places the blood sample and appropriate ingredients in the test tube 10 and assembles the test tube within the photographic cartridge 11, the assembly of the test tube 10 and cartridge 11 is inserted into the bore of the holder 14 while the mercury switch 35 is in vertical position, and the mercury switch 35 is lowered to a position of rest against the upwardly projecting top of the test tube 10, disposing the mercury switch 35 in proper angular position to establish the electrical circuit between the two electrodes thereof. The operator then momentarily presses the push button start switch 33, which completes the 120-volt AC supply circuit from the lead 30 to the lead 31 and input terminal 32a of timer motor 25, the supply from the other 120-volt supply lead 38 being also completed to the input terminal 32b through lead 37, mercury switch 35 and lead 34. The completion of the supply circuit by depressing the start switch 33 energizes the timer motor 25 for sufficient period to move the raised lobe 28 on the timer cam 27 out from under the movable contact member 29a of switch 29, whereupon the movable contact member 29a engages the lower stationary contact 29c and maintains the supply circuit from lead 30 to lead 31 throughout the remainder of the one-hour timing cycle.

At the completion of the one-hour timing cycle, the raised lobe 28 on the timer cam 27 again comes into engagement with the movable contact member 29a of the switch 29 to raise the contact member 29a into circuit making relation with the upper stationary contact 29b and terminate the supply to the motor 25 by breaking the circuit through the lower stationary contact 29c. The making of the circuit through upper stationary contact 29b completes the supply to the transformer 41 and rectifier 42, producing a 24-volt DC output on the leads 43 and 44. This 24-volt DC output is immediately applied through the movable contact 47' and normally closed contact 47a of relay 47, and lead 48, to the coil of relay 46, energizing this relay and drawing its movable contact 46' downwardly to make with the stationary contact 46b. This completes the 120-volt supply circuit through leads 49 and 50, on the one hand, and through lead 51 on the other hand, to the lamp 16 to energize the exposure lamp. At the completion of the delay period established by the delay device 53 or built-into the relay 47, which delay period corresponds to the appropriate exposure time for the photographic emulsion of the cartridge 11, the relay 47 is energized, drawing its movable contact 47' downwardly to break the circuit through its normally closed upper stationary contact 47a, thus de-energizing relay 46 and breaking the supply circuit to the exposure lamp 16. Concurrently, the making of the circuit through the movable contact member 47' and the normally open lower stationary contact 47b completes the circuit through leads 44 and 52 to the electromagnet 45, energizing the electromagnet and withdrawing the plunger 18 from beneath the test tube 10 and cartridge 11 to allow them to slide axially downwardly a selected distance within the holder 14 to a position where they can be readily removed from beneath the assembly. This downward movement of the test tube 10 allows the mercury switch 35 to drop to a substantially horizontal position, which breaks the supply circuit to the lower terminal of transformer 41 through leads 38 and 37 and completes the cycle of operation of the exposure lamp 16, relays 46, 47 and electromagnet 45. The momentum of the motor 25 and cam 27 carries the cam lobe 28 onto a position disposing the contact 29a between and out of contact with both stationary contacts 29b, 29c, the cam lobe 28 being of such height as to maintain the contact 29a lifted into engagement with contact 29b for a period at least as long or slightly longer than that required to complete the exposure and actuate the solenoid 45. To restart the apparatus to time out another blood specimen, the operator merely lifts the mercury switch 35 to vertical position, inserts the new test tube 10 with its blood sample and anti-coagulating solution in a new photographic cartridge 11, places them in the holder 14, lowers the mercury switch 35 until it rests on the top of the test tube 10, and presses the start button 33.

FIGURE 4 shows the schematic diagram of a modified circuit which is very similar to that of FIGURE 3, but which employs alternating current components. Those components which correspond directly to components of the FIGURE 3 form, although in some cases they are AC components rather than DC components, are indicated by the same reference characters as used in FIGURE 3. In the FIGURE 4 circuit it will be noted that one of the terminals of the coil for relay 46 is connected through lead 60 to the 120-volt AC supply lead 38, while the other terminal of the coil for relay 46 is connected to the output lead 61 of delay relay 62, which is, for example, a 2-second normally closed Amperite Delay Relay having its inputs connected to the input supply lead 38 and to the lead 63 which is connected to upper contact member 29b of cam controlled switch 29 and is therefore supplied with current from the other 120-volt AC input lead 30 when the movable contact member 29a is elevated by the lobe on the timer cam 27 to engage the upper contact member 29b at the end of the one-hour timing cycle.

One of the terminals of the coil of the other relay 47 is connected by lead 64 to the normally closed stationary contact 46a of relay 46, and the other terminal of the coil of relay 47 is connected to the output lead 65 of relay 66, which is, for example, a 3-second normally closed Amperite Delay Relay having its inputs also connected to input lead 38 and to lead 63.

The operation of the alternating current apparatus of FIGURE 4 is similar to that of FIGURE 3. Upon insertion of the test tube 10 with the blood sample and anti-coagulating solution into the cartridge 11 and this in turn into the holder 14, the operator actuates the push button 33 momentarily, completing the supply circuit from the input lead 30 to the timer motor 32a to begin operation of the timer motor 25, the timer cam 27 during this short term closure of the push button switch 33 carrying the lobe on the cam 27 out from under the movable switch contact member 29a to permit the latter to fall into contact with stationary contact member 29c and maintain the supply circuit from lead 30 to lead 31 and input terminal 32a. Upon completion of the one-hour interval, movement of the lobe on the cam 27 into contact with the movable contact member 29a lifts the same out of contact with contact member 29c to terminate further energizing of the motor 25 and elevates the contact 29a into contact with stationary contact 29b to place voltage on the lead 63. The voltage applied to the lead 63 is immediately applied through the normally closed delay relay 62 to the coil of relay 46, energizing this relay and applying voltage from its movable contact arm 46', connected to the input lead 30, to the lower stationary contact 46b and thus the lead 50 to the lamp 16. The other terminal of the lamp 16, as well as one terminal of solenoid coil 45, is connected through lead 67 to the 120-volt AC lead 38. Thus upon initial energization of the relay 46, the exposure lamp 16 will be energized for the 2-second delay period of delay relay 62, after which relay 46 is de-energized and the release of its movable arm 46' to return to its normally raised position breaks the supply to the lower stationary contact 46b and makes the supply to the upper stationary contact 46a which is connected to one of the terminals of the coil of relay 47. Relay 47 is thus energized for the one-second period between opening of the 2-second delay relay 62 and opening of the 3-second delay relay 66, to complete the supply circuit from supply lead 30 through its movable arm 47', its stationary contact 47b, and lead 52 to the solenoid coil 45 to retract the solenoid plunger and release the test tube 10 and cartridge 11 to fall out of the holder 14.

Referring now to FIGURES 5, 6, 7 and 8, and particularly to FIGURE 5, there is shown a schematic circuit diagram of a modified system useful for conducting a plurality of blood sedimentation rate tests, each started at different times. The embodiment herein illustrated is designed to conduct up to five blood sedimentation rate tests, in each of five different cartridges 11, each having one of the test tubes 10 therein. For such a system, a bank of cartridge holders 14 are provided in side-by-side relation, each aligned with its own respective exposure lamp 16, and the array of holders 14 and the exposure lamps 16 being arranged in a screen or partition assembly 70, shown in FIGURE 8, providing parallel light barrier partitions 71 extending from a common wall 72 between the respective associated pairs of cartridge holders and exposure lamps to prevent the light from any one exposure lamp influencing the light sensitive material in the other cartridges. In this multiple test assembly, each of the test tube stations defined by each cartridge holder 14 has its own mounting base 15 and its own solenoid or electromagnet coil 45 associated therewith, and a separate, one revolution per hour timer motor 25 with its associated cam controlled switch 29 assigned for each of the cartridge holders 14. Each such cartridge holder 14 has an 8-second, normally closed Amperite time delay relay 73 also respectively associated therewith.

Figure 6:
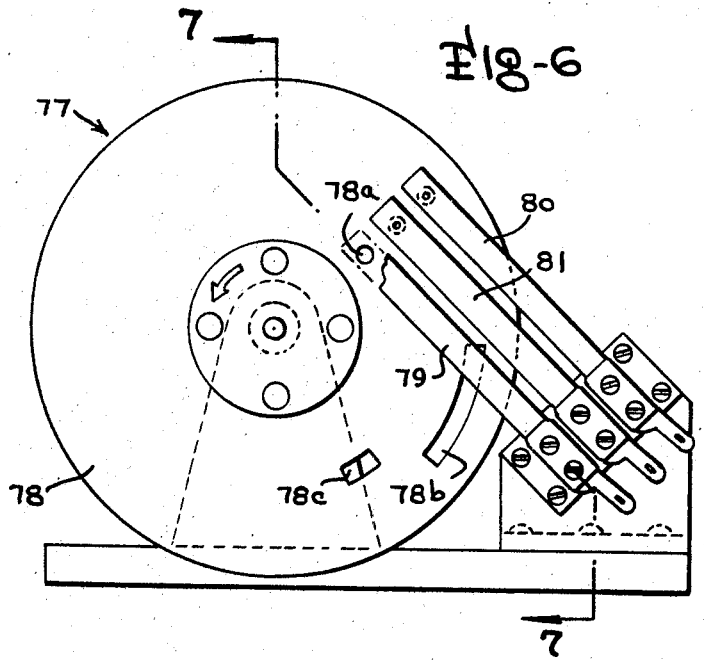
FIGURES 6 and 7 are respective side elevation and vertical section views of a sequence timing disk assembly usable with the apparatus of FIGURE 5.
Figure 7:
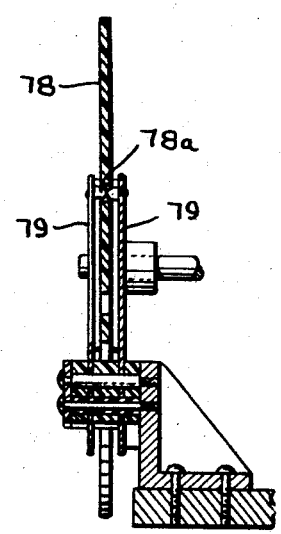
Figure 8:
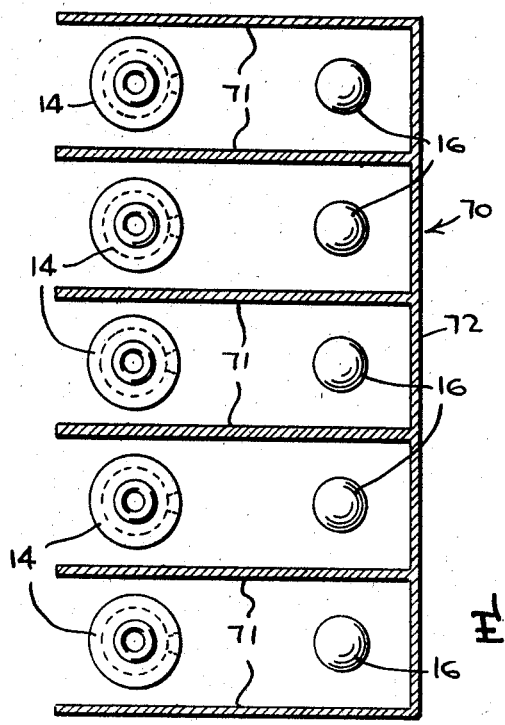
FIGURE 8 is a top plan view of a light screen device for use in the apparatus of FIGURE 5.

However, instead of using the sequence timing circuitry between the cam controlled switches 29 and the cartridge holders 14 of the type described in the preceding embodiments, a different sequence timing arrangement is provided by a latching relay 74 having a right hand hand coil 75 and a left hand coil 76, together with a sequence timing motor assembly 77, for example a 3-r.p.m. timing disk type AC motor unit, which serve to actuate in common all five cartridge stations and their associated timing motors 25, exposure lamps 16, and solenoids 45. The assembly 77 has an insulative disk 78, keyed or otherwise fixed to the shaft of the motor, associated with three respective pairs of contact members, such as leaf spring contacts 79, 80 and 81 having contact buttons or contact formations on the ends thereof located in three respective radial paths on the disk 78 to make electrical contact between the respective members of the contact pairs upon registry with openings in the disk 78 or electrically conductive inserts therein or electrically connected wiper strips on opposite surfaces of the disk 78. In the preferred embodiment herein illustrated, as shown in FIGURE 7, the disk 78 has openings 78a, 78b and 78c along circumferential paths of appropriate radius to establish contact between the contact members 79, 80 or 81, respectively.

In addition to the basic sequence timing components of the latching relay 74, and the sequence timing motor 77, which serve to effect sequence timing for all five of the test tubes, there is also provided a station control relay 82 for each of the respective cartridge holders 14. In the normal or rest condition of the sequence timing circuit components, the opening 78a in the timing disk 78 is spaced slightly beyond registry with the contact buttons of the contact members 79, having passed momentarily through registry at the end of the preceding sequence timing cycle. The pulse thus generated when the two contact members 79 engaged each other, one of the contact members 79 being directly connected to the 120-volt supply lead 38 and the other being connected through the right hand latching relay coil 75 to the other 120-volt supply lead 30, energized the right hand latching relay coil 75. Since the interconnected pair of latching relay contact arms 75a, 76a are spring retained in whatever position they are drawn to by the last activation of the coils, their normal rest position is the right hand position illustrated in FIGURE 5. The contacts 73a of the time delay relay 73 are in closed condition with one of the contacts 73a, as well as one of the terminals of its internal heater, connected to the upper contact 29b of the cam controlled switches 29 for each of the five timer motors 25. The other contact 73a of the time delay relay 73 is connected to the movable contact arm 82a and one terminal of the coil of relay 82 associated with the particular cartridge holder 14 with which the timing motor 25 is associated, here indicated as relay 82–1.

Upon insertion of one of the cartridges 11 into one of the cartridge holders 14, the start switch 33 for the timer motor 25 associated with that particular cartridge holder is acuated to start timing of the timing motor 25. As other cartridges 11 are inserted in other cartridge holders 14, the timing motors 25 associated with those other cartridge holders 14 are similarly energized to commence timing of the timing motors. Upon timing out of the one-hour cycle for the timing motor 25 associated with the cartridge holder 14 into which the first cartridge was placed, the lobe on the timing motor cam 26 lifts the cam controlled switch contact 29a into engagement with its companion stationary contact 29b, thus applying the 120-volt AC supply voltage from lead 30 to the 8-second time delay relay 73. The contact 73a of relay 73 being closed, this voltage is also applied through the contact arm 82a of the associated station control relay 82–1, and the upper stationary contact 82b thereof, to the left hand coil 76 of the latching relay 74, drawing the latching relay arms 75a and 76a to the left. The left hand movable contact 76a in this left hand position completes the supply circuit to the sequence timing motor 77 to initiate the 3-minute full cycle revolution of the timing disk 78. The movement of the latching relay arm 75a to its left hand position also completes the supply circuit to the lower terminal of the station control relay coil 82–1, thus drawing its movable contact arm 82a downwardly to engage the lower stationary contact 82c and apply voltage from line 30 to one of the movable contact arms 84a of master lamp control relay 84 and to one of the movable contact arms 85a of master solenoid control relay 85.

The master lamp control relay 84 has a number of such movable contact arms corresponding to the number of exposure lamps 16, for example five in this embodiment, and the master solenoid control relay 85 has a similar number of movable contact arms 85a. The remaining movable contact arms 84a and 85a of these two relays are respectively connected to the lower normally open stationary contacts 82c of the remaining station control relays 82 respectively associated with each of the other cartridge supporting stations. The normally open stationary contacts associated with the respective movable contact arms 84a are connected to their associated exposure lamps 16 while the normally open companion stationary contacts associated with the movable contact arms 85a are connected to their respective associated solenoid coils 45. The opposite terminals of the lamps 16 and solenoid coils 45 are connected in common to the 120-volt supply lead 38.

The coil of the master lamp control relay 84 is connected to the second set of contact members 80 associated with the timing disk 78, while the coil of the master solenoid relay 85 is connected to the contact members 81. Thus, when the timing disk 78 has rotated through a sufficient arc to bring the slot 78b into registry with the contact buttons of contact members 80, the master lamp control relay coil 84 is energized, drawing all of its movable contact arms 84a downwardly. Since the station control relay 82–1 has already placed voltage on the relay contact arm 84a associated with the exposure lamp 16–1, that lamp will be energized upon completion of the supply circuit to the relay coil 84. The circumferential extent of the slot or opening 78b is appropriate to provide a 2-second exposure time for the cartridge 11 exposed to the exposure lamp 16–1. Immediately upon completion of this closure time, the slot 78c in the disk 78 comes into registry with the contact buttons of contact members 81, completing the supply circuit to relay coil 85 to similarly energize the solenoid coil 45–1 and release the cartridge 11 associated with the timer motor 25 which has just timed out its one-hour timing cycle. At the end of the 8-second time delay period following activation of the cam control switch 29, the time delay relay contacts 73a open, withdrawing the supply voltage from lead 30 to the station control relay coil 82 and contact 82c, while the three minute timing motor 77 continues to time out its 3-minute cycle until the opening 78a again registers with the contact members 79, completing the circuit through the right hand latch and relay coil 75 and drawing its movable contact arms 75a, 76a to the right to break the supply circuit to the 3-minute timing motor 77. The opening 78a in the disk 78 operating the motor stopping contact members 79 is of sufficiently small extent to permit only a pulse of energy to be applied to the latching relay coil 75 to return its contact arms 75a, 76a to the right for disconnecting the supply to the motor 77 and to the bottom of the station control relay coils 82, whereupon the momentum of the disk is just enough to separate the contact members 79 again so as to avoid any danger of "flip-flopping" the latching relay upon making of the contact 29b of another cam control switch 29.

It will be apparent that upon timing out of the one-hour cycle of the second timing motor 25 associated with the holder 14 into which the second test tube was placed, the making of the contact 29b with movable contact 29a will in like manner supply voltage from the supply line 30 through the contacts 73a of its associated time delay relay 73 and thence to the movable contact arm 82 of its associated station control relay 82 to again energize the latching relay coil 76, shifting the latching relay contact arms 75a, 76a to the left to energize the 3-minute timing motor 77 and the lower terminal of the station control relay coils 82. Rotation of the disk 78 will then produce the sequence cycle energization of the master lamp relay coil 84 to energize the exposure lamp 16–2, and then operation of the master solenoid relay coil 85 to energize the solenoid 45–2 to cause the second cartridge 12 to drop out of the second cartridge holder 14.

FIGURE 9 illustrates schematically an alternate arrangement which may be used with the timing disk 78, wherein, instead of providing the leaf spring type contact members 79–81, lamps 85 are provided on one side of the disk 78 in alignment with the respective pairs of the slots 78a, 78b and 78c, while a photo-electric or photo-conductive light sensor 86, for example an L-14B combined photocell and amplifier, is disposed on the opposite side of the disk 78 to receive light through the associated slot therein, and energize a relay coil 87, whose contacts are connected in the circuit of FIGURE 5 in like manner to the contact members 79, 80 and 81, a power transistor 88 being also incorporated in the circuit, if desired.

FIGURES 10 and 11 also illustrate an alternate form of disk and contact assembly which may be used with the timing motor 25 instead of the cam 27 and cam control switch 29. In the embodiment of FIGURES 10 and 11, a disk 90 similar to the timing disk 78 is provided on the shaft of the timing motor 25 and has an opening 90a at a selected angular position therein adapted to register with a pair of leaf spring type contact members 29b' and 29a' flanking the opposite sides of the disk 90. A third contact member 29c' is spaced slightly to one side of the contact member 29a' to be engaged by the latter when the disk opening 29a is out of registry with the contact buttons of contact members 29a' and 29b'. It will be apparent that the electrical operation of this timing disk 90 and contact members 29a', 29b' and 29c' will be the same as that described for the cam 27 and its cam control switch 29.

An inclined rack 92 having an array of substantially semi-cylindrical concave wells to respectively receive the test tubes when they drop out of the cartridge holders 14 may be disposed below the holders 14. To signal when a test tube has fallen into one of these wells, a leaf spring type contact assembly 93 may be associated with the bottom of each well of the rack 92, including a contact arm 93a projecting into the well to be engaged by the test tube, a normally closed upper contact 93b, and a normally open lower contact 93c. A signal lamp 94 may be connected between the lower contact 93c and the supply lead 38 to be energized when the lower contact 93c makes contact with contact arm 93a responsive to dropping of a test tube into its associated well.

To facilitate reliable patient identification with the photographic record produced by the apparatus, the cartridge 11 may be provided with an adhesive tape which is perforated across its center and has an identifying number printed on both halves. The technician can then remove one of the numbered halves and permanently attach it to the patient's laboratory record sheet. The identical number can also be pre-printed on the reverse side of the photosensitive material.

What is claimed is:

1. Apparatus for automatically timing and recording the sedimentation rate of fluid samples for a selected test period, comprising an axially elongated light-transmissive container tube for holding the sample, a cartridge housing the tube including photosensitive material which is normally retarded from image-recording exposure encircling selected circumferential portion of the exterior surface of said tube spanning the axial height thereof and having circumferentially spaced edges defining an axially elongated space therebetween, holder means for supporting the cartridge and tube in a fixed vertical position, exposure lamp means adjacent said space between said edges for supplying exposure light through said space and said tube to record in said photosensitive material an image indicative of sedimentation layers in the tube, electrical timer means operable concurrently with insertion of the cartridge in the holder means for automatically timing said selected test period and generating a signal at the conclusion thereof, and electrical circuit means responsive to said signal for energizing said exposure lamp means for an exposure interval to record said image.

2. Apparatus for automatically timing and recording the sedimentation rate of blood samples for a selected test period, comprising an axially elongated light-transmissive test tube for holding the blood sample, an opaque tubular cartridge for enclosing said test tube having an inner surface coaxially confronting the test tube and a light-admitting slit extending substantially the height of the test tube paralleling the axis thereof, photosensitive material lining said inner surface, holder means for supporting the cartridge and test tube in a fixed vertical position, exposure lamp means adjacent said slit for supplying exposure light through said slit and test tube to record in said photosensitive material an image indicative of sedimentation layers in the test tube, electrical timer means operable concurrently with insertion of the cartridge in the holder means for automatically timing said selected test period and generating a signal at the conclusion thereof, and electrical circuit means responsive to said signal for energizing said exposure lamp means for an exposure interval to record said image.

3. Apparatus as defined in claim 2, wherein said circuit means includes means operated in timed relation to energization of said exposure lamp means for distinctively signaling with respect to said test tube when the test period therefor and recording of said image thereof has been completed.

4. Apparatus as defined in claim 2, wherein said holder means includes retractable bottom supporting means for said cartridge, and said electrical circuit means includes retraction means automatically operated in timed relation to energization of said exposure lamp means for retracting said bottom supporting means at the conclusion of said exposure interval to release said cartridge for downward axial displacement relative to said holder means.

5. Apparatus as defined in claim 4, wherein said timer means includes a motor driven rotary timer disk and contact means controlled thereby to be closed at the end of said test period, and said circuit means includes first relay means operated responsive to closure of said contact means to energize said exposure lamp means and second relay means operated a delay period equal to said exposure interval following operation of said first means to energize said retractable bottom supporting means to release said cartridge.

6. Apparatus as defined in claim 5, wherein said retractable bottom supporting means includes a solenoid and a reciprocative bottom platform member coupled thereto for supporting the cartridge, said second relay having contact means for energizing said solenoid to retract said platform member from supporting relation to said cartridge at the conclusion of said exposure interval.

7. Apparatus as defined in claim 2, wherein said timer means includes a motor driven rotary timer disk and contact means controlled thereby to be closed at the end of said test period, and said circuit means includes first means operated responsive to closure of said contact means to energize said exposure lamp means and second means operated a delay period equal to said exposure interval following operation of said first means to activate the later to terminate energization of said exposure lamp means.

8. Apparatus as defined in claim 7, wherein said second means is a normally closed time delay relay having thermally responsive contacts and a heater for opening said contacts at the end of said delay period.

9. Apparatus as defined in claim 7, wherein said first means is a first relay having normally open contacts closed immediately responsive to closure of said contact means to energize said exposure lamp means, and said second means is a second relay having time delay means associated therewith operative a selected delay period equal to said exposure interval following closure of said contact means to activate said first relay to terminate energization of said exposure lamp means.

10. Apparatus as defined in claim 7, wherein said first and second means comprise a first and second relay, respectively, a first normally closed time delay relay coupled between said contact means and said first relay, a second normally closed time delay relay coupled between said contact means and said second relay, each of said time delay relays being internally conditioned to open after a selected time delay interval following closure of said contact means, said second time delay relay having a longer time delay interval than the first time delay relay, and said first relay having contacts connected with said second relay to maintain the latter de-energized while said first relay is energized and to energize said second relay upon de-energization of said first relay when second time delay relay is in closed condition.

11. Apparatus for automatically timing and recording the sedimentation rate for a selected test period for a plurality of blood samples whose test periods start at different times, comprising an axially elongated light-transmissive test tube for holding each respective blood sample, an opaque tubular cartridge for enclosing each respective test tube having an inner surface coaxially confronting its associated test tube and a light-admitting slit extending substantially the height of the test tube paralleling the axis thereof, photosensitive material lining said inner surface, a plurality of holder means for supporting the cartridges and their contained test tubes in a fixed vertical position at a plurality of adjacent respective cartridge stations, an exposure lamp adjacent each station for supplying exposure light through the slit and test tube of the associated cartridge to record in said photosensitive material an image indicative of sedimentation layers in the test tube, an electrical test period timer for each respective station operable concurrently with insertion of the associated cartridge in its holder means for automatically timing said selected test period and generating a signal at the conclusion thereof, electrical circuit means including lamp control means responsive to said signal for energizing the exposure lamp adjacent the associated station for an exposure interval to record said image, and signalling means for distinctively indicating the test tube for which the test period and recording of said image has been completed.

12. Apparatus as defined in claim 11, wherein said signaling means comprises releasable means at each respective holder means for supporting the cartridge in a selected first position therein, and means activated concurrently with termination of said exposure interval for actuating said releasable means to release said cartridge to a second distinctive position.

13. Apparatus as defined in claim 11, wherein said circuit means includes means common to all of said lamp control means and to said timers for selectively activating the lamp control means to energize only the the exposure lamp for the test tube whose associated timer has generated said signal.

14. Apparatus as defined in claim 13, wherein said lastmentioned means comprises sequence timer means activated for a selected cycle period responsive to said signal and station control relay means coupled with the respective test period timers for sequentially energizing the exposure lamp for only the test tube associated with the test period timer producing said signal and activating the signaling means for that test tube.

15. Apparatus as defined in claim 14, wherein said signaling means comprises releasable means at each respective holder means for supporting the cartridge in a selected first position therein, and means activated concurrently with termination of said exposure interval for actuating said releasable means to release said cartridge to a second distinctive position.

16. Apparatus as defined in claim 13, wherein said sequence timer means including a rotary disk having plural pairs of timer contacts associated therewith and formations at selected radial and circumferential zones of said disk for closing selected pairs of said timer contacts in preselected timed relation and sequence, and a relay having a coil energized upon closure of a pair of said timer contacts and plural relay contacts respectively controling electrical supply to all of said exposure lamps, said sequence timer being activated through its cycle responsive to each of said signals generated by said test period timers, and said station control relay means being controlled by their respective associated test period timers to complete the electrical supply through said relay contacts to only the exposure lamp for the cartridge station whose associated test period timer generated said signal.

17. A container cartridge for enclosing an axially elongated light-transmissive container tube holding a fluid sample to be subjected to a sedimentation rate test, comprising a cartridge for housing the major length of said tube having a substantially cylindrical inner surface coaxially confronting the tube, a bottom wall closing the bottom of said cartridge, and a layer of photosensitive material lining said inner surface normally retarded from image-recording exposure extending in a substantially cylindrical path coaxially about the tube and having circumferentially spaced edges defining an opening therebetween for selected passage of exposure-producing light through said opening and said tube onto said photosensitive material.

18. A container cartridge for enclosing an axially elongated light-transmissive test tube holding a blood sample to be subjected to a sedimentation rate test, comprising an opaque tubular cartridge for enclosing the major length of said test tube having a substantially cylindrical inner surface coaxially confronting the test tube and a light-admitting slit extending substantially the height of the test tube paralleling the axis thereof, a bottom wall closing the bottom of said cartridge, a layer of photosensitive material lining said inner surface extending in a substantially cylindrical path coaxially about the test tube and having circumferentially spaced edges defining an opening therebetween registering with said slit, and light stop means for selectively closing said slit and the top of said cartridge against entry of light therethrough.

19. A container cartridge as defined in claim 18, wherein said light stop means comprises an opaque top wall member for said cartridge which is penetrable by said test tube to admit the latter into said cartridge.

20. A container cartridge as defined in claim 19, wherein said light stop means includes a removable light stop strip covering said slit to prevent entry of light therethrough.

References Cited

UNITED STATES PATENTS

| | | | |
|---|---|---|---|
| 2,725,782 | 12/1955 | Worley | 356—39 |
| 3,261,256 | 7/1966 | Morton | 356—40 |
| 3,288,019 | 11/1966 | Blumenfeld | 356—39 |

RICHARD B. WILKENSON, Primary Examiner

J. W. HARTARY, Assistant Examiner

U.S. Cl. X.R.

346—138; 355—104; 356—39, 246